(12) United States Patent
Breton et al.

(10) Patent No.: US 8,117,428 B2
(45) Date of Patent: Feb. 14, 2012

(54) APPARATUS AND METHOD FOR AUTOMATICALLY SAVING AND RESTORING PAD CONFIGURATION REGISTERS IMPLEMENTED IN A CORE POWER DOMAIN

(75) Inventors: Alain Breton, Saint Paul (FR); Christophe Vatinel, Mouans Sartoux (FR); Sivayya Venkata Ayinala, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 406 days.

(21) Appl. No.: 12/478,715

(22) Filed: Jun. 4, 2009

(65) Prior Publication Data

US 2010/0313003 A1   Dec. 9, 2010

(51) Int. Cl.
*G06F 9/24* (2006.01)
*G06F 15/177* (2006.01)

(52) U.S. Cl. ............... 713/1; 713/2; 713/320; 713/323; 711/100

(58) Field of Classification Search .............. 713/1, 2, 713/320, 323; 711/100
See application file for complete search history.

(56) References Cited

U.S. PATENT DOCUMENTS

| | | | | |
|---|---|---|---|---|
| 5,241,680 | A * | 8/1993 | Cole et al. | 713/322 |
| 6,230,274 | B1 * | 5/2001 | Stevens et al. | 713/320 |
| 2004/0153762 | A1 * | 8/2004 | Flynn et al. | 714/15 |
| 2005/0195664 | A1 * | 9/2005 | Ooishi | 365/194 |
| 2008/0082803 | A1 * | 4/2008 | Bystricky et al. | 712/228 |
| 2008/0136451 | A1 * | 6/2008 | Simmons et al. | 326/62 |
| 2008/0263396 | A1 * | 10/2008 | Kimura | 714/15 |
| 2010/0148820 | A1 * | 6/2010 | Nishioka | 326/39 |

* cited by examiner

*Primary Examiner* — Vincent Tran
(74) *Attorney, Agent, or Firm* — John R. Pessetto; W. James Brady; Frederick J. Telecky, Jr.

(57) ABSTRACT

According to various illustrative embodiments, an apparatus, system, and method for automatically saving and restoring pad configuration registers implemented in a core power domain are described. In one aspect, the apparatus comprises a save and restore logic component implemented in the core power domain and coupled to the pad configuration registers. The apparatus also comprises a memory instantiated in an always-on power domain and coupled to the save and restore logic component, the save and restore logic component implemented in the core power domain to automatically save the pad configuration registers in the memory in a pad configuration save process before a power supply to the core power domain is switched off and to automatically restore the pad configuration registers from the memory in a pad configuration restore process after the power supply to the core power domain is switched on.

11 Claims, 3 Drawing Sheets

APPARATUS AND METHOD FOR AUTOMATICALLY SAVING AND RESTORING PAD CONFIGURATION REGISTERS IMPLEMENTED IN A CORE POWER DOMAIN

TECHNICAL FIELD OF THE PRESENT DISCLOSURE

The present disclosure relates generally to automatically saving and restoring pad configuration registers in information handling systems. More particularly, the present disclosure describes an apparatus, system, and method useful for automatically saving and restoring pad configuration registers implemented in a core power domain.

BACKGROUND OF THE PRESENT DISCLOSURE

The power supply to a core power domain is switched off to reduce power leakage in standby mode. However, switching off the power supply to the core power domain causes loss of information from the pad configuration registers that are implemented in the core power domain. The pad configuration registers may need to be restored when the power supply to the core power domain is switched back on. No external memory is accessible until the pad configuration registers are restored, for example. Furthermore, only a limited number of inputs and/or outputs are allowed at the boundary between the core power domain and an always-on power domain to avoid routing congestion.

Conventional D flip-flop implementations can have power leakage from the chip as high as 5.6 µW. Moreover, conventional D flip-flop implementations can occupy a chip area as large as 0.05 mm². Conventional placement of the pad configuration registers in the always-on power domain leads to undesirable place and route congestion. Conventionally, software interactions are needed to restore the pad configuration registers.

SUMMARY OF THE PRESENT DISCLOSURE

According to various illustrative embodiments, an apparatus, system, and method for automatically saving and restoring pad configuration registers implemented in a core power domain are described. In one aspect, the apparatus comprises a hardware save and restore logic component implemented in the core power domain and coupled to the pad configuration registers. The apparatus also comprises a memory instantiated in an always-on power domain and coupled to the hardware save and restore logic component, the hardware save and restore logic component implemented in the core power domain to automatically save the pad configuration registers in the memory in a pad configuration save process before a power supply to the core power domain is switched off and to automatically restore the pad configuration registers from the memory in a pad configuration restore process after the power supply to the core power domain is switched on.

In another aspect, a method for automatically saving and restoring pad configuration registers implemented in a core power domain comprises automatically saving the pad configuration registers in a memory instantiated in an always-on power domain and coupled to a hardware save and restore logic component implemented in the core power domain and coupled to the pad configuration registers, automatically saving the pad configuration registers before a power supply to the core power domain is switched off. The method also comprises automatically restoring the pad configuration registers from the memory after the power supply to the core power domain is switched on.

In yet another aspect, a system for automatically saving and restoring pad configuration registers implemented in a control module in a core power domain is provided, the system comprising a hardware save and restore logic component implemented in the control module in the core power domain and coupled to the pad configuration registers. The system also comprises a power manager instantiated in an always-on power domain and coupled to the hardware save and restore logic component. The system also comprises a memory instantiated in a wakeup control module in the always-on power domain and coupled to the hardware save and restore logic component, the hardware save and restore logic component implemented in the control module in the core power domain to automatically save the pad configuration registers in the memory in a pad configuration save process before a power supply to the core power domain is switched off and to automatically restore the pad configuration registers from the memory in a pad configuration restore process after the power supply to the core power domain is switched on, wherein the pad configuration restore process is started by the power manager after the power supply to the core power domain is switched on.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which the leftmost significant digit(s) in the reference numerals denote(s) the first figure in which the respective reference numerals appear, wherein:

It is to be noted, however, that the appended drawings illustrate only typical embodiments of the present claimed subject matter and are, therefore, not to be considered limiting of the scope of the present claimed subject matter, as the present claimed subject matter may admit to other equally effective embodiments.

Notation and Nomenclature

Certain terms are used throughout the following description and claims to refer to particular system components and configurations. As one skilled in the art having the benefit of the present disclosure will appreciate, companies may refer to a component by different names. This document does not intend to distinguish between components that differ in name but not function. In the following discussion and in the claims, the terms "including" and "comprising" are used in an open-ended fashion, and, thus, should be interpreted to mean "including, but not limited to . . . ," and so forth. Also, the term "couple" or "couples" is intended to mean either an indirect or direct electrical connection. Thus, if a first device couples to a second device, that connection may be through a direct electrical connection or though an indirect electrical connection via other devices and/or connections. Furthermore, the term "information" is intended to refer to any data, instructions, or control sequences that may be communicated between components of a device. For example, if information is sent between two components, data, instructions, control sequences, or any combination thereof may be sent between the two components.

DETAILED DESCRIPTION OF ILLUSTRATIVE EMBODIMENTS

Illustrative embodiments of the present claimed subject matter are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

Figure 1:
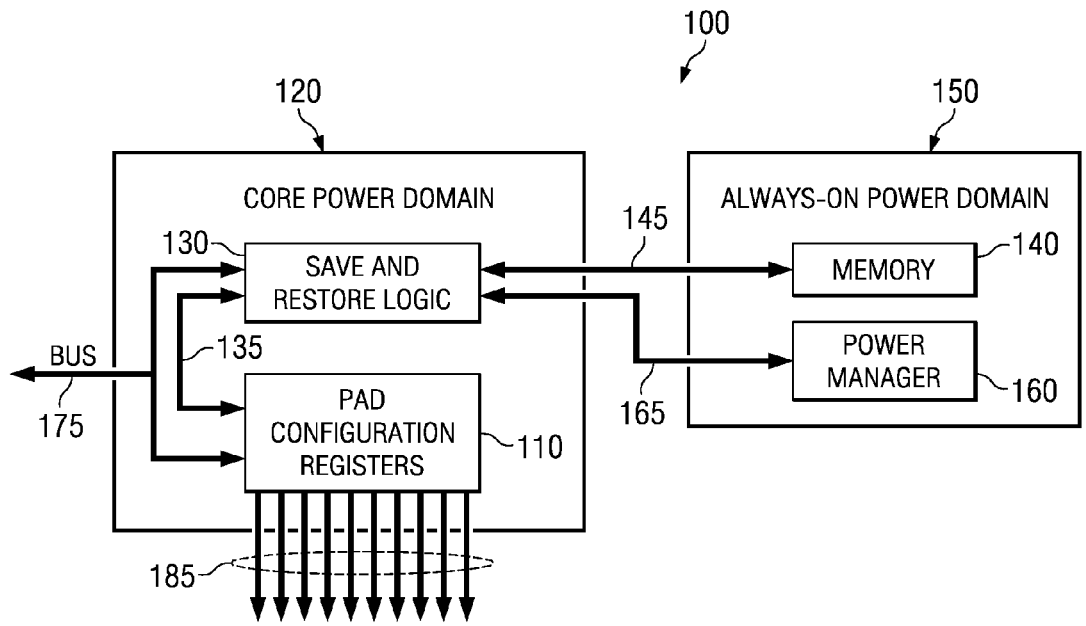
FIG. 1 schematically illustrates a particular example of various illustrative embodiments of an apparatus in accord with the present disclosure.

In various illustrative embodiments, as shown in FIG. 1, for example, an apparatus 100 for automatically saving and restoring pad configuration registers 110 implemented in a core power domain 120 may comprise a hardware save and restore logic component 130 implemented in the core power domain 120 and coupled 135 to the pad configuration registers 110. The apparatus 100 may also comprise a memory 140 instantiated in an always-on power domain 150 and coupled 145 to the hardware save and restore logic component 130. In various illustrative embodiments, the memory 140 may be a static random access memory (SRAM) implemented in the always-on power domain 150. The hardware save and restore logic component 130 may be implemented in the core power domain 120 to automatically save the pad configuration registers 110 in the memory 140 in a pad configuration save process before a power supply to the core power domain 120 is switched off. The hardware save and restore logic component 130 may also be implemented in the core power domain 120 to automatically restore the pad configuration registers 110 from the memory 140 in a pad configuration restore process after the power supply to the core power domain 120 is switched on.

Figure 2:
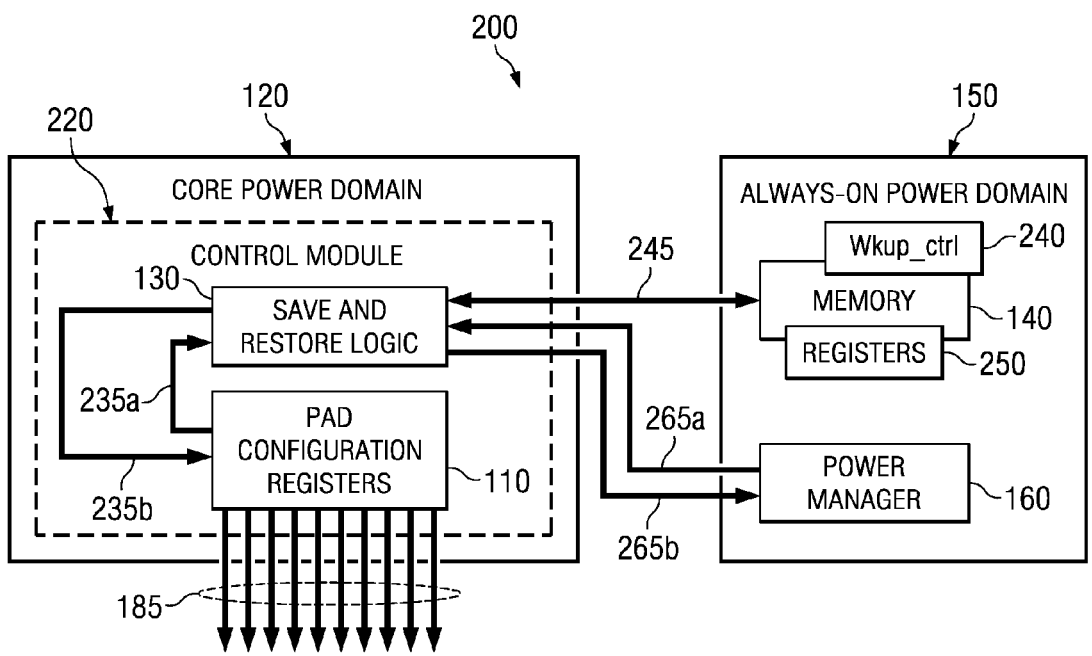
FIG. 2 schematically illustrates another particular example of various illustrative embodiments of an apparatus and a system in accord with the present disclosure.

In various illustrative embodiments, the pad configuration save process is started before the power supply to the core power domain 120 is switched off. In various illustrative embodiments, the pad configuration save process is started by software and/or firmware and/or an ASIC before the power supply to the core power domain 120 is switched off. In various illustrative embodiments, once the save process is started, switching the core power domain 120 off may be gated until the save process is complete. As shown in FIG. 2, for example, the pad configuration save process may be started by having a start save signal 235a sent from the pad configuration registers 110 to the hardware save and restore logic component 130 before the power supply to the core power domain 120 is switched off. Similarly, as also shown in FIG. 2, for example, the pad configuration save process may be completed by having a save done signal 235b sent from the hardware save and restore logic component 130 to the pad configuration registers 110 before the power supply to the core power domain 120 is switched off.

In various illustrative embodiments, as shown in FIG. 1, for example, the apparatus 100 for automatically saving and restoring pad configuration registers 110 implemented in a core power domain 120 may further comprise a power manager 160 instantiated in the always-on power domain 150 and coupled 165 to the hardware save and restore logic component 130. The pad configuration restore process is started by the power manager 160 after the power supply to the core power domain 120 is switched on. As shown in FIG. 2, for example, the pad configuration restore process may be started by the power manger 160 by having a start restore signal 265a sent from the power manger 160 to the hardware save and restore logic component 130 after the power supply to the core power domain 120 is switched on. Similarly, as also shown in FIG. 2, for example, the pad configuration restore process may be completed by having a restore done signal 265b sent from the hardware save and restore logic component 130 to the power manger 160 after the power supply to the core power domain 120 is switched on.

In various illustrative embodiments, as shown in FIG. 2, for example, the pad configuration registers 110 are automatically saved in a portion 250 of the memory 140 to which one or more other write commands are disabled. For example, once the pad configuration registers 110 have been automatically saved in the portion 250 of the memory 140, any subsequent write commands directed to the portion 250 of the memory 140 are not enabled, keeping the pad configuration registers 110 that have been automatically saved in the portion 250 of the memory 140 from being overwritten.

As shown in FIG. 1, the hardware save and restore logic component 130 and/or the pad configuration registers 110 may be coupled 175, through a bus, for example, to other components of an information handling system (not shown). Similarly, the pad configuration registers 110 may be coupled 185 to respective pads (not shown).

In various illustrative embodiments, the apparatus 100 reduces power leakage from a chip relative to a flip-flop implementation and reduces an area of the chip occupied relative to the flip-flop implementation. For example, as described above, conventional D flip-flop implementations can have power leakage from the chip as high as 5.6 μW. Moreover, conventional D flip-flop implementations can occupy a chip area as large as 0.05 mm$^2$. By way of contrast, in various illustrative embodiments, the power leakage from a chip may be reduced to about 3 μW and may occupy a chip area of only about 0.03 mm$^2$.

As also described above, conventional placement of pad configuration registers in an always-on power domain leads to undesirable place and route congestion. By way of contrast, in various illustrative embodiments, the apparatus 100 reduces place and route congestion relative to an implementation having the pad configuration registers 110 instantiated in the always-on power domain 150.

Moreover, as also described above, conventionally, software interactions are needed to restore the pad configuration registers. By way of contrast, in various illustrative embodiments, the hardware save and restore logic component 130 permits much higher performance by not requiring any software interaction to automatically restore the pad configuration registers 110. The hardware save and restore logic component 130 may be implemented in the core power domain 120 to automatically save the pad configuration registers 110 in the memory 140 in the pad configuration save process before the power supply to the core power domain 120 is switched off. The hardware save and restore logic component 130 may also be implemented in the core power domain 120 to automatically restore the pad configuration registers 110 from the memory 140 in the pad configuration restore process after the power supply to the core power domain 120 is switched on.

FIG. 2 schematically illustrates a particular example of various illustrative embodiments of a system 200 for automatically saving and restoring pad configuration registers 110 implemented in a control module 220 in a core power domain 120, in accord with the present disclosure. The system 200 may comprise a hardware save and restore logic component 130 implemented in the control module 220 in the core power domain 120 and coupled 235a, 235b to the pad configuration registers 110. The system 200 may also comprise a power manger 160 instantiated in an always-on power domain 150 and coupled 265a, 265b to the hardware save and restore logic component 130. The system 200 may also comprise a memory 140 instantiated in a wakeup control module 240 in the always-on power domain 150 and coupled 245 to the hardware save and restore logic component 130. The hardware save and restore logic component 130 may be implemented in the control module 220 in the core power domain 120 to automatically save the pad configuration registers 110 in the memory 140 in a pad configuration save process before a power supply to the core power domain 120 is switched off. The hardware save and restore logic component 130 may also be implemented in the control module 220 in the core power domain 120 to automatically restore the pad configuration registers 110 from the memory 140 in a pad configuration restore process after the power supply to the core power domain 120 is switched on. The pad configuration restore process may be started by the power manger 160 after the power supply to the core power domain 120 is switched on. In various illustrative embodiments, the pad configuration registers 110 may be automatically saved in a portion 250 of the memory 140 to which one or more other write commands are disabled.

Figure 3:
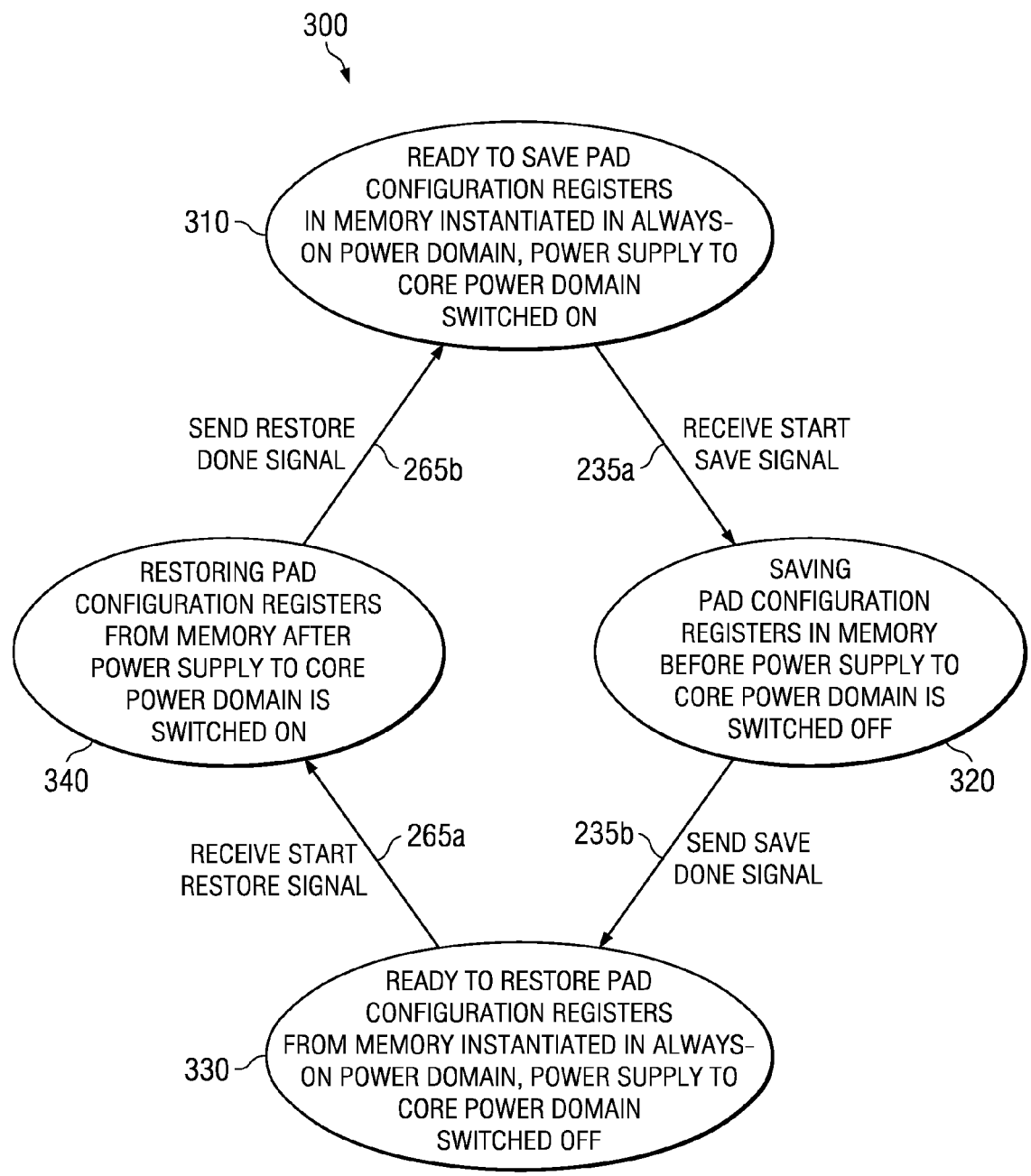
FIG. 3 schematically illustrates a particular example of various illustrative embodiments of internal states for a hardware save and restore logic component useful in an apparatus and a system in accord with the present disclosure.

FIG. 3 schematically illustrates a particular example of various illustrative embodiments of internal states 300 for the hardware save and restore logic component 130 useful in the apparatus 100 and the system 200 in accord with the present disclosure. The hardware save and restore logic component 130 may be in a state 310 that is ready to save the pad configuration registers 110 in the memory 140 instantiated in the always-on power domain 150 while the power supply to the core power domain 120 is switched on. The hardware save and restore logic component 130 may be in a state 310 before the power supply to the core power domain 120 is switched off.

Upon receiving a start save signal 235a from the pad configuration registers 110, the hardware save and restore logic component 130 may transition to a state 320 of saving the pad configuration registers 110 in the memory 140 before the power supply to the core power domain 120 is switched off. Upon completion of saving the pad configuration registers 110 in the memory 140 before the power supply to the core power domain 120 is switched off, the hardware save and restore logic component 130 may send a save done signal 235b to the pad configuration registers 110. The hardware save and restore logic component 130 may then transition to a state 330 that is ready to restore the pad configuration registers 110 in the memory 140 instantiated in the always-on power domain 150 while the power supply to the core power domain 120 is switched off, before the power supply to the core power domain 120 is switched on.

Upon receiving a start restore signal 265a from the power manager 160, the hardware save and restore logic component 130 may transition to a state 340 of restoring the pad configuration registers 110 from the memory 140 after the power supply to the core power domain 120 is switched on. Upon completion of restoring the pad configuration registers 110 from the memory 140 after the power supply to the core power domain 120 is switched on, the hardware save and restore logic component 130 may send a restore done signal 265b to the power manger 160 and may transition to the state 310.

Figure 4:
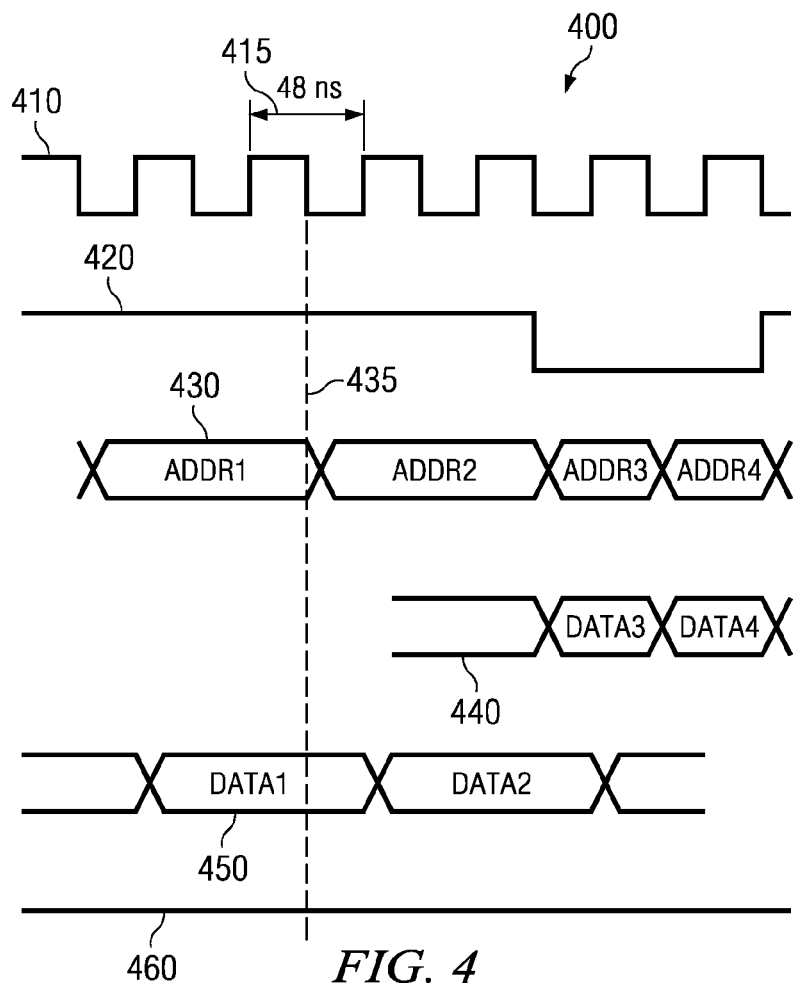
FIG. 4 schematically illustrates a particular example of various illustrative embodiments of a timing diagram useful for an apparatus in accord with the present disclosure.

FIG. 4 schematically illustrates a particular example of various illustrative embodiments of a timing diagram 400 for the wakeup control module 240 that is useful for the apparatus 100 and the system 200 in accord with the present disclosure. In various illustrative embodiments, the wakeup control module 240 configuration interface may be characterized as shown in Table 1.

TABLE 1

Wakeup control module configuration interface

| Signal name and size | Direction | Description |
| --- | --- | --- |
| Clk | Input | Clock |
| Addr[11:0] | Input | Address bus |
| DataIn[31:0] | Input | Write data bus |
| ByteEn[3:0] | Input | Byte enable |
| DataOut[31:0] | Output | Read data bus |
| RnW | Input | Read/Write transfer |
| MReqSecure | Input | Secure request |
| MReqSupervisor | Input | Supervisor request |
| PadWrAccessEn | Input | Pad configuration register write access enable |

In various illustrative embodiments, the control module 220 and the wakeup control module 240 interface may use an open core protocol (OCP) clock divided by four to reduce power consumption in the always-on power domain 150 in which the wakeup control module 240 is instantiated. For example, as shown at 410 in FIG. 4, the Clk signal may have one clock cycle lasting about 48 ns, as shown by the double-headed arrow 415. The Read/Write Transfer RnW signal may be as shown at 420. The Addr signal may be as shown at 430. The DataIn signal may be as shown at 440. The DataOut signal may be as shown at 450. The PadWrAccess signal may be as shown at 460, showing a logical "1" or "high" value throughout the timing sequence shown in FIG. 4, for example. The dashed line 435 at a falling edge of a clock cycle may schematically illustrate data sampled in the control module 220. In various illustrative embodiments, the control module 220 clock output may be provided as a clock input for the wakeup control module 240 by being inverted, meaning that address and data have half a cycle of setup time and half a cycle of hold time. There may be about a one and a half period margin used to take into account round trip data propagation from the control module 220 to the wakeup control module 240 and back. The address map may be as shown in Table 2.

TABLE 2

Address map

| Offset Address | Register Mnemonic | Description |
| --- | --- | --- |
| 0x0600-0x09FC | CONTROL_SAVE_RESTORE_MEM | Memory mapped save and restore location. (1 Kbyte). 0x600-0x830: non-accessible (pad configuration). 0x834-0x9FC: user accessible. |
| 0x0A00 + i | CONTROL_PADCONF_x | Configuration register for pad x located in wakeup domain—16bit registers. |
| 0x0A60 | CONTROL_SEC_TAP | Tap Controllers Security Control register, access can be done in secure privilege mode only. |
| 0x0A64 | CONTROL_SEC_EMU | Emulation Security Control register. |

Figure 5:
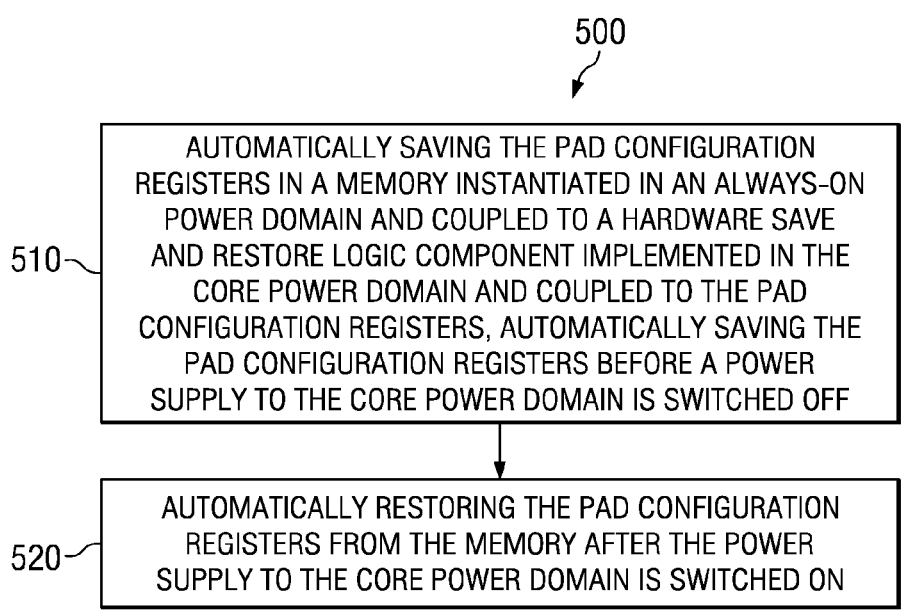
FIG. 5 schematically illustrates a particular example of various illustrative embodiments of a method in accord with the present disclosure.

FIG. 5 schematically illustrates a particular example of various illustrative embodiments of a method 500 useful for automatically saving and restoring the pad configuration registers 110 implemented in the core power domain 120, in accord with the present disclosure. The method 500 comprises automatically saving the pad configuration registers 110 in the memory 140 instantiated in the always-on power domain 150 and coupled to the hardware save and restore logic component 130 implemented in the core power domain 120 and coupled to the pad configuration registers 110, as shown at 510. The method 500 also comprises automatically saving the pad configuration registers 110 before a power supply to the core power domain 120 is switched off, as also shown at 510. The method 500 also comprises automatically restoring the pad configuration registers 110 from the memory 140 after the power supply to the core power domain 120 is switched on, as shown at 520.

In various illustrative embodiments, as shown in FIG. 2, for example, automatically saving 510 the pad configuration registers 110 may be started by having a start save signal 235a sent from the pad configuration registers 110 to the hardware save and restore logic component 130 before the power supply to the core power domain 120 is switched off. As also shown in FIG. 2, for example, automatically saving 510 the pad configuration registers 110 may be completed by having a save done signal 235b sent from the hardware save and restore logic component 130 to the pad configuration registers 110 before the power supply to the core power domain 120 is switched off.

In various illustrative embodiments, as shown in FIG. 1, for example, the method 500 useful for automatically saving and restoring the pad configuration registers 110 implemented in the core power domain 120 may further comprise providing a power manger 160 instantiated in the always-on power domain 150 and coupled to the hardware save and restore logic component 130. Automatically restoring 520 the pad configuration registers 110 is started by the power manger 160 after the power supply to the core power domain 120 is switched on. As shown in FIG. 2, for example, automatically restoring 520 the pad configuration registers 110 may be started by the power manger 160 by having a start restore signal 265a sent from the power manger 160 to the hardware save and restore logic component 130 after the power supply to the core power domain 120 is switched on. As shown in FIG. 2, for example, automatically restoring 520 the pad configuration registers 110 may be completed by having a restore done signal 265b sent from the hardware save and restore logic component 130 to the power manger 160 after the power supply to the core power domain 120 is switched on.

In various illustrative embodiments, as shown in FIG. 2, for example, automatically saving 510 the pad configuration registers 110 may further comprise automatically saving 510 the pad configuration registers 110 in a portion 250 of the memory 140 to which one or more other write commands are disabled. For example, as described above, once the pad configuration registers 110 have been automatically saved in the portion 250 of the memory 140, any subsequent write commands directed to the portion 250 of the memory 140 may not be enabled, keeping the pad configuration registers 110 that have been automatically saved in the portion 250 of the memory 140 from being overwritten.

In various illustrative embodiments, the method 500 reduces power leakage from a chip relative to a flip-flop method and reduces an area of the chip occupied relative to the flip-flop method. For example, as described above, conventional D flip-flop implementations can have power leakage from the chip as high as 5.6 μW. Moreover, conventional D flip-flop implementations can occupy a chip area as large as 0.05 mm$^2$. By way of contrast, in various illustrative embodiments, the power leakage from a chip may be reduced to about 3 μW and may occupy a chip area of only about 0.03 mm$^2$.

Similarly, as also described above, conventional placement of pad configuration registers in an always-on power domain leads to undesirable place and route congestion. By way of contrast, in various illustrative embodiments, the method 500 reduces place and route congestion relative to a method having the pad configuration registers 110 instantiated in the always-on power domain 150.

According to various illustrative embodiments, an apparatus, system, and method for automatically saving and restoring pad configuration registers implemented in a core power domain are described. In one aspect, the apparatus comprises a hardware save and restore logic component implemented in the core power domain and coupled to the pad configuration registers. The apparatus also comprises a memory instantiated in an always-on power domain and coupled to the hardware save and restore logic component, the hardware save and restore logic component implemented in the core power domain to automatically save the pad configuration registers in the memory in a pad configuration save process before a power supply to the core power domain is switched off and to automatically restore the pad configuration registers from the memory in a pad configuration restore process after the power supply to the core power domain is switched on.

In various aspects, the apparatus further comprises the pad configuration save process being started before the power supply to the core power domain is switched off. This apparatus further comprises the pad configuration save process being started by having a start save signal sent from the pad configuration registers to the hardware save and restore logic component before the power supply to the core power domain is switched off. This apparatus further comprises the pad configuration save process being completed by having a save done signal sent from the hardware save and restore logic component to the pad configuration registers before the power supply to the core power domain is switched off.

In various aspects, the apparatus further comprises a power manager instantiated in the always-on power domain and coupled to the hardware save and restore logic component, wherein the pad configuration restore process is started by the power manager after the power supply to the core power domain is switched on. This apparatus further comprises the pad configuration restore process being started by the power manager by having a start restore signal sent from the power manager to the hardware save and restore logic component after the power supply to the core power domain is switched on. This apparatus further comprises the pad configuration restore process being completed by having a restore done signal sent from the hardware save and restore logic component to the power manager after the power supply to the core power domain is switched on.

In various aspects, the apparatus further comprises the pad configuration registers being automatically saved in a portion of the memory to which one or more other write commands are disabled.

In various aspects, the apparatus further comprises the apparatus reducing power leakage from a chip relative to a flip-flop implementation and reducing an area of the chip occupied relative to the flip-flop implementation.

In various aspects, the apparatus further comprises the apparatus reducing place and route congestion relative to an implementation having the pad configuration registers instantiated in the always-on power domain.

In another aspect, a method for automatically saving and restoring pad configuration registers implemented in a core power domain comprises automatically saving the pad configuration registers in a memory instantiated in an always-on power domain and coupled to a hardware save and restore logic component implemented in the core power domain and coupled to the pad configuration registers, automatically saving the pad configuration registers before a power supply to the core power domain is switched off. The method also comprises automatically restoring the pad configuration registers from the memory after the power supply to the core power domain is switched on.

In various aspects, the method further comprises automatically saving the pad configuration registers being started by having a start save signal sent from the pad configuration registers to the hardware save and restore logic component before the power supply to the core power domain is switched off. This method further comprises automatically saving the pad configuration registers being completed by having a save done signal sent from the hardware save and restore logic component to the pad configuration registers before the power supply to the core power domain is switched off.

In various aspects, the method further comprises providing a power manager instantiated in the always-on power domain and coupled to the hardware save and restore logic component, wherein automatically restoring the pad configuration registers is started by the power manager after the power supply to the core power domain is switched on. This method further comprises automatically restoring the pad configuration registers being started by the power manager by having a start restore signal sent from the power manager to the hardware save and restore logic component after the power supply to the core power domain is switched on. This method further comprises automatically restoring the pad configuration registers being completed by having a restore done signal sent from the hardware save and restore logic component to the power manager after the power supply to the core power domain is switched on.

In various aspects, the method further comprises automatically saving the pad configuration registers in a portion of the memory to which one or more other write commands are disabled.

In various aspects, the method further comprises the method reducing power leakage from a chip relative to a flip-flop method and reducing an area of the chip occupied relative to the flip-flop method.

In various aspects, the method further comprises the method reducing place and route congestion relative to a method having the pad configuration registers instantiated in the always-on power domain.

In yet another aspect, a system for automatically saving and restoring pad configuration registers implemented in a control module in a core power domain is provided, the system comprising a hardware save and restore logic component implemented in the control module in the core power domain and coupled to the pad configuration registers. The system also comprises a power manager instantiated in an always-on power domain and coupled to the hardware save and restore logic component. The system also comprises a memory instantiated in a wakeup control module in the always-on power domain and coupled to the hardware save and restore logic component, the hardware save and restore logic component implemented in the control module in the core power domain to automatically save the pad configuration registers in the memory in a pad configuration save process before a power supply to the core power domain is switched off and to automatically restore the pad configuration registers from the memory in a pad configuration restore process after the power supply to the core power domain is switched on, wherein the pad configuration restore process is started by the power manager after the power supply to the core power domain is switched on.

In accordance with the present disclosure, an apparatus, system, and method useful for automatically saving and restoring pad configuration registers implemented in a core power domain are disclosed. In various aspects, an apparatus in accordance with the present disclosure may comprise means for automatically saving and restoring pad configuration registers and means for enabling the means for automatically saving and restoring pad configuration registers, both the means for automatically saving and restoring pad configuration registers and the means for enabling the means for automatically saving and restoring pad configuration registers covering corresponding structures and/or materials described herein and equivalents thereof.

In various other aspects, a system in accordance with the present disclosure may comprise means for automatically saving and restoring pad configuration registers, means for enabling the means for automatically saving and restoring pad configuration registers, and means for using the means for automatically saving and restoring pad configuration registers, all of the means for automatically saving and restoring pad configuration registers, the means for enabling the means for automatically saving and restoring pad configuration registers, and the means for using the means for automatically saving and restoring pad configuration registers covering corresponding structures and/or materials described herein and equivalents thereof. In yet various other aspects, a method in accordance with the present disclosure may comprise steps for automatically saving and restoring pad configuration registers and steps for enabling the steps for automatically saving and restoring pad configuration registers, both the steps for automatically saving and restoring pad configuration registers and the steps for enabling the steps for automatically saving and restoring pad configuration registers covering corresponding acts described herein and equivalents thereof.

The particular embodiments disclosed above are illustrative only, as the present claimed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present claimed subject matter. In particular, every range of values (of the form, "from about a to about b," or, equivalently, "from approximately a to b," or, equivalently, "from approximately a-b") disclosed herein is to be understood as referring to the power set (the set of all subsets) of the respective range of values, in the sense of Georg Cantor. Accordingly, the protection sought herein is as set forth in the claims below.

What is claimed is:

1. An apparatus for automatically saving and restoring pad configuration registers implemented in a core power domain, the apparatus comprising:
    a save and restore logic component implemented in the core power domain and coupled to the pad configuration registers; and
    a memory instantiated in an always-on power domain and coupled to the save and restore logic component, the save and restore logic component implemented in the core power domain to automatically save the pad configuration registers in the memory in a pad configuration save process before a power supply to the core power domain is switched off and to automatically restore the pad configuration registers from the memory in a pad configuration restore process after the power supply to the core power domain is switched on;
    wherein the pad configuration save process is started before the power supply to the core power domain is switched off;
    wherein the pad configuration save process is started by having a start save signal sent from the pad configuration registers to the save and restore logic component before the power supply to the core power domain is switched off.

2. The apparatus of claim 1, wherein the pad configuration save process is completed by having a save done signal sent from the save and restore logic component to the pad configuration registers before the power supply to the core power domain is switched off.

3. An apparatus for automatically saving and restoring pad configuration registers implemented in a core power domain, the apparatus comprising:
    a save and restore logic component implemented in the core power domain and coupled to the pad configuration registers; and
    a memory instantiated in an always-on power domain and coupled to the save and restore logic component, the save and restore logic component implemented in the core power domain to automatically save the pad configuration registers in the memory in a pad configuration save process before a power supply to the core power domain is switched off and to automatically restore the pad configuration registers from the memory in a pad configuration restore process after the power supply to the core power domain is switched on;
    a power manager instantiated in the always-on power domain and coupled to the save and restore logic component, wherein the pad configuration restore process is started by the power manager after the power supply to the core power domain is switched on.

4. The apparatus of claim 3, wherein the pad configuration restore process is started by the power manager by having a start restore signal sent from the power manager to the save and restore logic component after the power supply to the core power domain is switched on.

5. The apparatus of claim 4, wherein the pad configuration restore process is completed by having a restore done signal sent from the save and restore logic component to the power manager after the power supply to the core power domain is switched on.

6. A method for automatically saving and restoring pad configuration registers implemented in a core power domain, the method comprising:
    automatically saving the pad configuration registers in a memory instantiated in an always-on power domain and coupled to a save and restore logic component implemented in the core power domain and coupled to the pad configuration registers, automatically saving the pad configuration registers before a power supply to the core power domain is switched off; and
    automatically restoring the pad configuration registers from the memory after the power supply to the core power domain is switched on;
    wherein automatically saving the pad configuration registers is started by having a start save signal sent from the pad configuration registers to the save and restore logic component before the power supply to the core power domain is switched off.

7. The method of claim 6, wherein automatically saving the pad configuration registers is completed by having a save done signal sent from the save and restore logic component to the pad configuration registers before the power supply to the core power domain is switched off.

8. A method for automatically saving and restoring pad configuration registers implemented in a core power domain, the method comprising:
    automatically saving the pad configuration registers in a memory instantiated in an always-on power domain and coupled to a save and restore logic component implemented in the core power domain and coupled to the pad configuration registers, automatically saving the pad configuration registers before a power supply to the core power domain is switched off;
    automatically restoring the pad configuration registers from the memory after the power supply to the core power domain is switched on; and providing a power manager instantiated in the always-on power domain and coupled to the save and restore logic component, wherein automatically restoring the pad configuration registers is started by the power manager after the power supply to the core power domain is switched on.

9. The method of claim 8, wherein automatically restoring the pad configuration registers is started by the power manager by having a start restore signal sent from the power manager to the save and restore logic component after the power supply to the core power domain is switched on.

10. The method of claim 9, wherein automatically restoring the pad configuration registers is completed by having a restore done signal sent from the save and restore logic component to the power manager after the power supply to the core power domain is switched on.

11. A system for automatically saving and restoring pad configuration registers implemented in a control module in a core power domain, the system comprising:

a save and restore logic component implemented in the control module in the core power domain and coupled to the pad configuration registers;
a power manager instantiated in an always-on power domain and coupled to the save and restore logic component; and
a memory instantiated in a wakeup control module in the always-on power domain and coupled to the save and restore logic component, the save and restore logic component implemented in the control module in the core power domain to automatically save the pad configuration registers in the memory in a pad configuration save process before a power supply to the core power domain is switched off and to automatically restore the pad configuration registers from the memory in a pad configuration restore process after the power supply to the core power domain is switched on, wherein the pad configuration restore process is started by the power manager after the power supply to the core power domain is switched on.

* * * * *